United States Patent [19]

McDaniel

[11] Patent Number: 4,664,895

[45] Date of Patent: May 12, 1987

[54] HIGH CONCENTRATION BORIC ACID SOLIDIFICATION PROCESS

[75] Inventor: Keith K. McDaniel, Laurel, Md.

[73] Assignee: Westinghouse Electric Corp., Pittsburgh, Pa.

[21] Appl. No.: 629,393

[22] Filed: Jul. 10, 1984

[51] Int. Cl.[4] ........................ C01B 35/10; G21F 9/16; C04B 12/04

[52] U.S. Cl. ........................ 423/277; 106/74; 252/629; 252/631

[58] Field of Search ........................ 252/631, 629, 628; 106/74; 210/710, 751; 501/155; 423/277

[56] References Cited

U.S. PATENT DOCUMENTS

| | | | |
|---|---|---|---|
| 3,298,960 | 1/1967 | Pitzer | 252/628 |
| 3,507,801 | 4/1970 | Kausz et al. | 252/628 |
| 3,837,872 | 9/1974 | Connor | 106/74 |
| 3,841,102 | 10/1974 | Cinner | 405/128 |
| 3,988,258 | 10/1976 | Curtiss et al. | 252/628 |
| 4,122,028 | 10/1978 | Iffland et al. | 252/628 |
| 4,173,546 | 11/1979 | Hayer | 252/628 |
| 4,333,847 | 6/1982 | Tran et al. | 252/629 |
| 4,363,757 | 12/1982 | Koster et al. | 252/628 |
| 4,376,070 | 3/1983 | Pope et al. | 252/629 |
| 4,379,081 | 4/1983 | Rootham et al. | 252/628 |
| 4,404,105 | 9/1983 | Rysman de Lockerente et al. | 210/710 |
| 4,415,364 | 11/1983 | Naito et al. | 106/74 |
| 4,422,965 | 12/1983 | Chickering et al. | 252/629 |
| 4,424,149 | 1/1984 | Bege et al. | 252/629 |
| 4,435,184 | 3/1984 | Schroeder | 252/631 X |
| 4,462,971 | 7/1984 | Hinnenkamp et al. | 423/277 |
| 4,482,481 | 11/1984 | Bandyopadhyay et al. | 252/628 |
| 4,504,317 | 3/1985 | Smeltzer et al. | 252/631 X |
| 4,505,851 | 3/1985 | Funabashi et al. | 252/628 |
| 4,518,508 | 5/1985 | Conner | 252/628 X |
| 4,530,723 | 7/1985 | Smeltzer et al. | 252/628 X |

FOREIGN PATENT DOCUMENTS

| | | | |
|---|---|---|---|
| 812192 | 1/1974 | Belgium | 252/629 |
| 0077978 | 5/1983 | European Pat. Off. . | |
| 0088587 | 9/1983 | European Pat. Off. . | |
| 2910677 | 9/1980 | Fed. Rep. of Germany . | |
| 133499 | of 1977 | Japan | 252/629 |
| 1557261 | 12/1979 | United Kingdom . | |
| 1587921 | 4/1981 | United Kingdom | 252/629 |

OTHER PUBLICATIONS

Subramanian, R. V. and R. A. V. Raff—Solidification of Low Level Radioactive Wastes, 1974, Circular 50—Washington State University College of Engineering.

*Primary Examiner*—John F. Terapane
*Assistant Examiner*—Virginia B. Caress

[57] ABSTRACT

A process is described for the solidification of concentrated boric acid waste solutions. The waste solution must have a boric acid concentration greater than 30% by weight. Sodium metasilicate is added to the boric acid waste solution and is mixed; a dry, hard product is formed. The process is not hindered by the presence of up to 40% dewatered bead resins.

8 Claims, No Drawings

HIGH CONCENTRATION BORIC ACID SOLIDIFICATION PROCESS

BACKGROUND OF THE INVENTION

The increasing importance of reducing radioactive waste quantities at nuclear facilities has made the concentration of all types of waste highly desirable. One such waste is boric acid slurries. More efficient evaporators are now capable of producing boric acid concentrations at nuclear power plants of greater than 50% by weight. The current method for solidifying high concentrations of borated waste is by solidification with hardeners such as cement. This method involves the addition of Portland cement and various other additives necessary to combat retardation of cement hydration by the boron. The packaging efficiencies (waste volume/product volume) achieved by cement solidification is limited to about 0.80, and several days are required to pass before the material can be transported. Ion exchange resins are sometimes found in the boric acid waste slurries and represent a further hindrance to cement solidification.

U.S. Pat. No. 4,122,028, issued on Oct. 24, 1978 to Iffland et al, describes a process for solidifying and eliminating radioactive borate containing liquids. Slaked lime and Portland cement are added to the boron containing aqueous solution and up to 30% of the cement can be replaced by silica or kieselguhr. Water glass and phosphoric acid or hydrogen phosphate can be added to increase strength, accelerate setting and improve resistance to leaching. The borate is usually present in the waste liquid of sodium borate, but may be present as potassium borate or boric acid.

U.S. Pat. No. 3,298,960, issued on Jan. 17, 1967 to Pitzer, describes a method for disposal of waste solutions using rigid gels. The gel products are formed by the addition of sodium silicate or formaldehyde to certain metal cleaning waste solutions. One such solution contains metal corrosion products dissolved in hydrazine and EDTA.

U.S. Pat. No. 3,507,801, issued on Apr. 21, 1970, describes a process for entrapment of radioactive waste water using sodium borate. After the sodium borate is added to the waste water the mixture is thickened by heating until the remaining quantity of water is no larger than can be bonded as water of crystallization to the sodium borate. This concentrate is drained into the containers where it cools and crystallizes, the water being incorporated into the solid crystals.

U.S. Pat. No. 3,988,258, issued on Oct. 26, 1976 to Curtis et al, describes a process for disposal of radioactive waste by incorporating it into a hardenable matrix-forming mass. Alkali or alkaline earth silicate is added to a cement-type binding agent to form the matrix material. The process is said to promote solidification of all common nuclear power industry radioactive waste including boric acid solutions.

As noted above, previous waste disposal processes using hardeners such as cement to produce a solidified product employed antihydration retardants to quicken the setting of the cement in the presence of the waste. One such antihydration retardant employed is sodium metasilicate, used not only with boric acid bearing wastes, but also with a variety of other wastes such as oils. When used with cement, sodium metasilicate functions to quicken setting of the cement in the presence of various waste products.

SUMMARY OF THE INVENTION

This invention provides a method for handling troublesome boric acid concentrations of greater than 30% by weight. The process of this invention requires the addition of only one solidification agent, sodium metasilicate. The process is not hindered by the boric acid present, but rather it is the boric acid and its low pH environment that enables the process to form a dry, hard product. The packaging efficiencies achieved by this process can exceed 0.97. In addition, ion exchange resin slurries can also be processed with boric acid by encapsulation of the beads within the solidified matrix. This can be accomplished from boric acid concentrations of 40% or greater. The percentage of dewatered bead resins can be as high as 40% of the total quantity of waste.

DESCRIPTION OF THE PREFERRED EMBODIMENT

An initial series of tests produced silica gel and sodium tetraborate separately in order to obtain qualitative data concerning the mechanisms involved in the making of these two compounds. The silica gel was made by lowering the pH of several different concentrations of sodium silicate solutions. The concentrations of the sodium silicate solutions ranged from 4.7% to 28.6% solids by weight. The sodium metasilicate used to make the solutions was Metso Beads 2048. Sulfuric acid was used to adjust the pH to between 3 and 6. In this low pH environment the silicate dissociates and forms long $SiO_2$ chains commonly called silica gel. The reaction can be easily reversed by raising the pH. The silica gel produced in these tests possessed low solubility characteristics, however, it was of poor structural quality.

The sodium tetraborate was made by dissolving boric acid and sodium hydroxide together. The dissociated boron and sodium ions joined to form the salt sodium tetraborate. The boric acid to sodium hydroxide weight ratio used was 3 to 1. The product possessed good structural properties but was fairly soluble.

By combining the solidification agent sodium metasilicate with boric acid both of the above reactions occur. The silica gel is produced by driving the pH of the sodium silicate solution down using boric acid, and the sodium tetraborate is formed by the combination of sodium and borate ions. The combination of silica gel and sodium tetraborate formed a product possessing desirable structural and solubility characteristics. The reaction produces acceptable results when a waste slurry comprising greater than 30 wt.% boric acid is used and sodium metasilicate is added to the slurry in the ratio 1 part boric acid slurry to between about 0.1 to 0.4 parts sodium metasilicate by weight. When using a 50 wt.% boric acid slurry, for example, the mixing ratio yielding the best result was 1.00 part boric acid slurry to 0.25 parts sodium metasilicate by weight.

The procedure to produce this reaction requires only mixing. Since the slurries are normally kept in a constantly agitated state and maintained at high temperatures, temperature and pH adjustments are not required, and the number of steps involved in the process is minimal. A waste slurry comprising greater than 30% by weight boric acid is thick at ambient temperatures and must be kept agitated. The slurry can be made less viscous by heating, but will never dissolve completely at atmospheric pressure.

Sodium metasilicate is slowly added to the slurry while mixing; heat is generated as the alkali and acid combine. Mixing is continued until a sudden increase in viscosity is observed. For a small sample this may require 5 to 10 minutes of thorough mixing. Once the reaction starts it takes only several seconds for the mixture to set, and within minutes the product is dry and hard, ready for transportation.

Analysis of the product using X-ray diffraction shows that the compound formed was sodium tetraborate decahydrate. The silica gel formed in the reaction is not recognized by the X-ray diffraction apparatus since it is an amorphous material having no crystalline structure. However, the initial series of tests discussed at the beginning of this section do indicate that silica gel is produced when sodium metasilicate is placed in a low pH environment.

Compression tests were formed on samples of solidified 50 wt.% boric acid. The first set of samples used cement and sodium metasilicate as the solidification agents, while the second set of solidifications used only sodium metasilicate as follows:

| | Cement and Sodium Metasilicate | Sodium Metasilicate |
|---|---|---|
| Water | 23.15 wt % | 40.0 wt % |
| Boric Acid | 23.15 wt % | 40.0 wt % |
| Cement | 46.30 wt % | — |
| Sodium metasilicate | 7.41 wt % | 20.0 wt % |

The samples were of cylindrical configuration, 3 inches in diameter and 6 inches in height. The cylinders were placed in a hydraulic press and tested for ultimate strengths. The samples using cement and sodium metasilicate showed strengths of less than 100 psi. The samples using only sodium metasilicate possessed ultimate strengths between 500 psi and 700 psi.

A full scale in-container test was conducted in a 55 gallon drum to determine if any scale-up problems existed in solidification. A 50 wt.% boric acid slurry consisting of 14.4 gallons of water and 120 pounds of boric acid was prepared in the drum. A mixing blade agitated the slurry at 30 rpm. Sixty pounds of sodium metasilicate were slowly added to the slurry. After 20 minutes of agitation the mix begain to set and the mixing blade was immediately stopped and removed from the drum. In 5 minutes the mixture was set. The drum was sealed for 24 hours, then cut in half to examine the quality of the product. The product was completely dry and hard throughout the entire matrix. The consistency of the mix was homogeneous and gave no indication of cracks or swelling. By taking the ratio of waste volume to solidified product volume, the packaging efficiency was determined to be 98%.

Further experimentation has shown that the presence of ion exchange resin beads in the boric acid waste slurry does not hinder nor degrade the produce formed by the addition of sodium metasilicate so long as the boric acid concentration is greater than 40 wt.%.

In some instances producers of boric acid waste slurries will neutralize the acidity of the waste product by the addition of sodium hydroxide. If the boric acid is neutralized with sodium hydroxide the pH must be lowered. This can be done by the addition of an acid such as sulfuric acid. The sodium metasilicate can then be added and the reaction will take place. When solidifying neutralized boric acid waste slurries, however, it is best to first add the sodium metasilicate, making certain that the sodium metasilicate is well dissolved before adding the acid such as sulfuric acid to lower the pH to the pre-neutralized level. Solidification will then quickly occur, forming an acceptable product, as described above.

Further experimentation has shown that a closely related species, potassium metasilcate, does not produce an end product with the same desirable properties as sodium metasilicate in its reaction with boric acid. This is believed to result from the failure of potassium metasilicate in reacting with boric acid to form a decahydrate around the potassium tetraborate.

I claim:

1. A method of solidifying a waste slurry substantially without the use of a hardener where said waste slurry comprises greater than 30 wt.% boric acid, said method comprising:
 adding a solidification agent essentially consisting of sodium metasilicate to the waste slurry in the ratio of 1 part boric acid slurry to between about 0.1 to 0.4 parts sodium metasilicate by weight and mixing.

2. The method of claim 1 wherein the waste slurry contains ion-exchange resins of less than 40 wt.% and greater than 40 wt.% boric acid.

3. The method of claim 1 wherein said solidification agent is added to the acid waste slurry in the ratio 1 part boric acid waste slurry to about 0.25 parts sodium metasilicate by weight.

4. The method of claim 2 wherein said solidification agent is added to the acid waste slurry in the ratio 1 part boric acid waste slurry to about 0.25 parts sodium metasilicate by weight.

5. A method of solidifying a waste slurry substantially without the use of a hardener where said waste slurry comprises greater than 30 wt.% boric acid which has been previously reduced in acidity, said method comprising: a solidification agent essentially consisting of sodium metasilicate to the waste slurry in the ratio of 1 part boric acid slurry to between about 0.1 to 0.4 parts sodium metasilicate by weight, adding acid to the slurry/sodium metasilicate mixture to return the acid reduced slurry to about its original pH, and mixing.

6. The method of claim 5 wherein the waste slurry contains ion exchange resins of less than 40 wt.% and greater than 40 wt.% boric acid.

7. The method of claim 5 wherein said solidification agent is added to the acid waste slurry in the ratio 1 part boric acid waste slurry to about 0.25 parts sodium metasilicate by weight.

8. The method of claim 5 wherein said acid is sulfuric acid.

* * * * *